July 7, 1925.

M. G. FREEMAN

SIMPLIFIED GEAR SHIFT

Filed March 11, 1925

1,544,897

Inventor

Melvin G. Freeman

By Lancaster A. Alwin

Attorneys

Patented July 7, 1925.

1,544,897

UNITED STATES PATENT OFFICE.

MELVIN G. FREEMAN, OF THE PLAINS, VIRGINIA, ASSIGNOR OF ONE-HALF TO SAMUEL CREEL, OF THE PLAINS, VIRGINIA.

SIMPLIFIED GEAR SHIFT.

Application filed March 11, 1925. Serial No. 14,803.

*To all whom it may concern:*

Be it known that I, MELVIN G. FREEMAN, a citizen of the United States, residing at The Plains, in the county of Fauquier and State of Virginia, have invented certain new and useful Improvements in a Simplified Gear Shift, of which the following is a specification.

This invention relates to improvements in gear shifting mechanism.

The primary object of this invention is the provision of an improved mechanism adapted for use in connection with automotive vehicles whereby to enable the throwing out of the clutch at the same time that the gear ratio of the transmission is changed.

A further and important object of this invention is the provision of a novel means connected with the gear shift handle of a motor vehicle transmission mechanism, by means of which to throw out the clutch automatically upon shifting of the gears.

A further object of this invention is the provision of an extensible gear shift handle which is of a simplified nature and which will permit of an easy operation to simultaneously throw the gear mechanism and release the clutch.

Other objects and advantages of this invention will be apparent during the course of the following detailed description.

In the accompanying drawing, forming a part of this specification, and wherein similar reference characters designate corresponding parts throughout the several views, Figure 1 is a side elevation showing a conventional type of transmission, and an approved type of clutch, with the improved simplified gear shifting mechanism cooperatively connected therewith.

Figure 1:
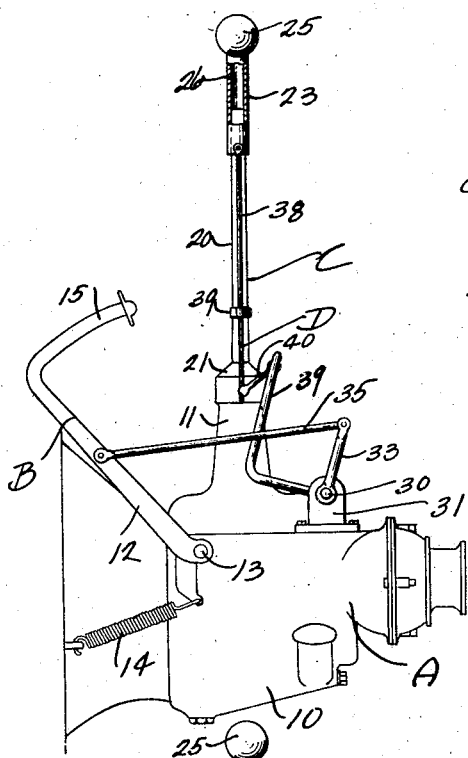
Figure 2:
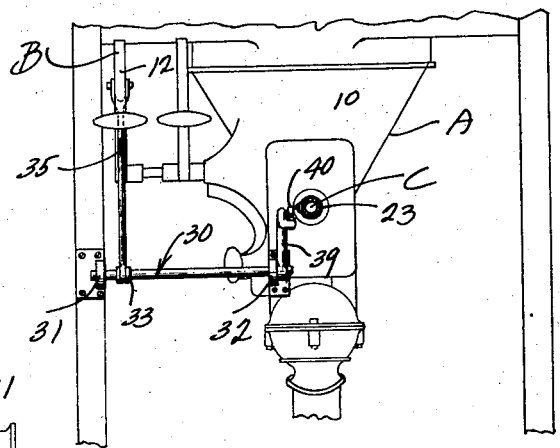
Figure 2 is a plan view, partly in section, of the improved simplified gear shift.
Figure 3:
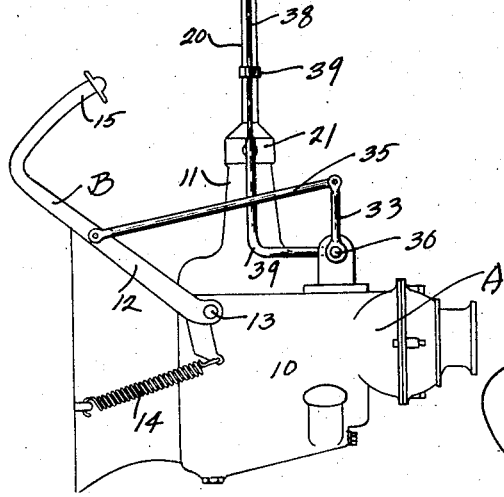
Figure 3 is a view showing the details illustrated in Figure 1, with the clutch thrown out and the improved simplified gear shift mechanism in position to accomplish this result; the position of parts being that which will occur at the interval between shifting from one gear to another.
Figure 4:
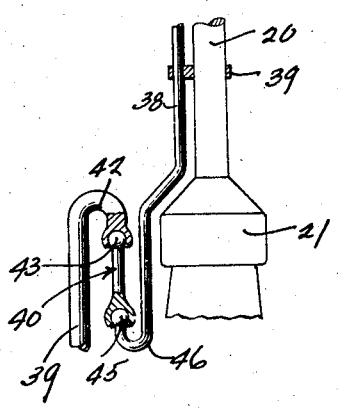
Figure 4 is a fragmentary view, partly in section, showing the universal jointed connection between the gear shift mechanism and the clutch operating mechanism.

In the drawing, wherein for the purpose of illustration is shown only a preferred embodiment of this invention, the letter A may generally designate a transmission of any approved character, adapted for motor vehicle use, and with which is cooperably associated a clutch mechanism B of any approved type, which is provided for the conventional purpose of releasing the engine crank shaft from the driven shaft during the changing of gears. The letter C may generally designate a novel type of gear shift handle for the transmission mechanism A; and D may designate the mechanism connected with the handle C and to the clutch B for the purpose of automatically releasing the latter upon the changing of gears.

The transmission mechanism A is of any approved character, and comprises the housing 10, with the normal upv .rdly extending projection 11, upon the upper end of which the handle C is universally connected in the well known manner.

The clutch B includes the clutch pedal 12, pivoted to the clutch shaft 13, and having an expansion spring 14 operating on the same to normally maintain the foot engaging end 15 in a predetermined position so that the same may be compressed for releasing the clutch, in accordance with conventional operation.

The improved gear shift handle C comprises the lower gear connected portion 20, swivelly connected in the upper end 21 of the transmission extension 11. The handle C furthermore includes the tubular extension 23, which is reciprocably mounted over the upper end of the lower portion 20, and which at the upper end thereof preferably provides the hand engaging ball 25. This tubular extension 23 is provided with a passageway 26 therein for reciprocably receiving the upper solid end of the lower portion 20 of said gear shift handle C. The gear shift handle C may differ in construction from that above described, since it is the principal feature of the handle that the same include a pair of reciprocably disposed extensible parts.

The mechanism D comprises a rocker shaft 30, preferably pivotally mounted at its ends upon bearings 31 and 32 appropriately provided upon the transmission housing, or automotive vehicle chassis. At one end the rocker shaft 30 is provided with a right angled upwardly extending arm 33 rigid therewith, which is pivotally connected with a connecting rod 35; said connecting rod 35 being pivotally connected at its opposite end to the clutch pedal 12.

The slidable sleeve or tubular extension 23 is preferably provided with a connecting rod 38; said connecting rod 38 extending downwardly along the handle portion 20, and reciprocably bearing in a band or suitable bearing 39 provided at the lower end of said handle portion 20. At its lower end the connecting rod 38 is connected with an L-shaped lever portion 39 by means of a double universal joint 40; said L-shaped lever portion 39 at one end being rigidly connected with the shaft 30, and extending forwardly and upwardly and at its upper end 42 being hook-shaped for pivotally receiving the ball head 43 at one end of the double universal joint 40. The double universal joint 40 at its lower end is preferably swivelly connected to the ball end 45 of the hook or U-shaped end 46 of the said connecting rod 38.

Referring to the operation of the improved simplified gear shift mechanism, it is to be particularly noted that the double universal joint structure 40 comprises a short connecting piece universally connected at its ends between the lever 39 and the lower end of the connecting rod 38. This universal connection occurs immediately adjacent the swivel point of the gear shift lever C with the transmission housing 10, so that the operation of this invention for automatically throwing out the clutch gear is readily accomplished. The operation is substantially as follows:—
When it is desired to shift gears the operator grasps the knob 25 or the extension portion 23 of the gear shift lever C, and involuntarily presses downwardly upon the same, as is the habit of motor vehicle operators. This action slides the extension 23 in a collapsed relation downwardly over the lower portion 20 of the gear shift lever C, and the degree of movement may be approximately six and one-half inches, more or less. This movement slides the connecting rod 38 downwardly, and incident to the double universal joint connection 40, the rocker shaft 30 will be rocked incident to the lever connection 39. Through the lever arm 33 and connecting rod 39 the clutch B will be released. With the clutch so released the gear shift lever C may be swivelled upon its pivot axis in the transmission housing, for the purpose of shifting the gears, which may be readily accomplished in any direction of movement of the gear shift lever C, without engaging the clutch B. Upon release of the gear shift handle, the parts will automatically resume their normal extended position, because of the spring action of the clutch B, which throws the shaft 30 to normal position and the handle extension 23 upwardly upon the lower handle portion 20, to the position illustrated in Figure 1, so that the clutch when engaged automatically positions the gear shift handle parts without any attention upon the part of the vehicle operator.

From the foregoing description of this invention it is apparent that a relatively simple, novel, durable, and efficient type of gear shift lever has been provided, which takes into consideration the fact that the vehicle operator may operate the mechanism with but little attention upon his part. The device may be readily installed as an accessory, since it requires very little alteration of the gear mechanism and clutch mechanism of conventional motor vehicles, to accomplish this attachment.

Various changes in the shape, size, and arrangement of parts may be made to the form of invention herein shown and descibed, without departing from the spirit of the invention or the scope of the claims.

I claim:

1. In combination with a transmission and a clutch mechanism, an operating handle movably connected with the transmission mechanism, means slidably mounted upon said handle, and means connected with said slidable means and with the clutch for releasing the latter upon movement of the handle to shift gears of the transmission.

2. In a simplified gear shift the combination with a transmission including a movably mounted operated handle portion, a clutch mechanism including a clutch lever, a portion slidably mounted upon said gear shift handle, a rocker shaft, means connecting said rocker shaft with said slidable portion of the handle for operating the shaft upon sliding of the portion on said handle, and means connecting said rocker shaft with the clutch lever for releasing the latter upon movement of the gear shift mechanism and handle to shift gears.

3. In a gear shift the combination with a gear shift mechanism including an operating handle, a clutch mechanism including an operating lever, a fixed rocker shaft, means movably connected with said gear shift handle for operating said rocker shaft, and means connecting said rocker shaft with said clutch lever for releasing the clutch upon changing of gears incident to movement of the gear shift handle.

4. The combination with a gear shift mechanism and a clutch mechanism, a handle for the gear shift mechanism including a portion movably connected to the gear shift mechanism, and an extension reciprocably mounted on the upper end of said first mentioned handle portion, and means connected with said extension and with the clutch mechanism for operating the latter to release it upon movement of said gear shift handle to shift gears.

5. In a gear shift mechanism the combination of a transmission mechanism including a movable handle having a reciprocable extension upon the upper end thereof, a clutch mechanism, and means connected with said reciprocable extension and clutch mechanism for operating the latter upon operation of said reciprocable extension.

6. In combination a gear shift mechanism including an operating handle, a clutch mechanism including a spring urged operating member normally held in clutching position by its spring, an extension slidable at the upper end of said gear shift handle, and means connected between said extension and clutch member for throwing out the clutch mechanism upon pushing of the extension downwardly over said gear shift handle, said extension being adapted to be returned to extended position by the spring operation of said clutch mechanism.

7. The combination with a gear shift mechanism and a clutch mechanism, of a motor vehicle, an operating handle movably connected with the gear shift mechanism, an operating lever movably connected with the clutch mechanism, a hand grasping portion movably connected with said handle portion of the gear shift mechanism, and means connected between said hand grasping portion and the movable lever of the clutch mechanism for throwing out the clutch upon shifting of gears, said means including a double universal joint swivelly mounted adjacent the pivot axis of the gear shift mechanism handle.

8. In combination a transmission mechanism including a housing and a swivelly mounted gear shift lever, an extension slidable at the upper end of said gear lever including a handle grasping portion, a connecting rod slidably mounted for reciprocation along said gear shifting lever and extending to adjacent the swivel axis of the gear shift lever on the transmission housing, a clutch mechanism including an operating lever, a double universal joint swivelly connected at one end to the connecting rod adjacent the swivel axis of the gear shifting lever with the transmission housing, and means connected with said universal joint and the clutch lever whereby the clutch mechanism will be released upon changing of gears incident to operation of said gear shift lever.

9. In a simplified gear shift the combination with a transmission mechanism including a housing, a gear shift lever swivelly mounted in said housing for the transmission mechanism, a tubular handle extension at the upper end of said gear shift lever reciprocably mounted for collapsed and extended sliding movement thereon, a connecting rod extending from said handle extension and slidably mounted for movement along said gear shift lever, a clutch mechanism including a spring urged lever, and means connecting said spring urged lever to the connecting rod for releasing the clutch mechanism upon initial movement of the gear shift lever for shifting gears.

10. In a simplified gear shift the combination with a transmission mechanism including a housing, a gear shift lever swivelly mounted in said housing for the transmission mechanism, a tubular handle extension at the upper end of said gear shift lever reciprocably mounted for collapsed and extended sliding movement thereon, a connecting rod extending from said handle extension and slidably mounted for movement along said gear shift lever, a clutch mechanism including a spring urged lever, means connecting said spring urged lever to the connecting rod for releasing the clutch mechanism upon initial movement of the gear shift lever for shifting gears, said last mentioned means including a double universal joint swivelly connected at one end with the lower end of said connecting rod adjacent the swivel axis of the gear shift lever of said transmission housing.

11. In combination a gear shift mechanism including a housing, a gear shift lever swivelly mounted in said housing, a tubular extension reciprocably carried at the upper end of said gear shift lever including a hand grasping portion thereon, a bearing on said gear shifting lever at the lower end thereof, a connecting rod connected with said tubular handle extension and slidably mounted in said bearing, a clutch mechanism including a pivotally mounted pedal, a rocker shaft mounted for movement on a fixed axis, an L-shaped connecting lever connected with said shaft, a double universal joint swivelly connected between said L-shaped connecting lever and lower end of the connecting rod which is slidable on said gear shift lever, said double universal joint being swivelly mounted adjacent the swivel action of the gear shift lever on said gear shift housing, and connecting rod means connecting the rocker shaft with the clutch pedal whereby upon movement of the handle extension downwardly over the gear shift lever said clutch mechanism will be released.

MELVIN G. FREEMAN.